(12) United States Patent
Frohnmayer et al.

(10) Patent No.: US 9,592,732 B2
(45) Date of Patent: Mar. 14, 2017

(54) VEHICLE POWERTRAIN WITH DUAL-INDEPENDENT TRANSMISSIONS

(71) Applicant: ARCIMOTO, INC., Eugene, OR (US)

(72) Inventors: Mark Douglas Frohnmayer, Eugene, OR (US); James Kevin Jordan, Eugene, OR (US); Paul Clark, Eugene, OR (US); Adrian Hawkins, Eugene, OR (US)

(73) Assignee: ARCIMOTO, INC., Eugene, OR (US)

( * ) Notice: Subject to any disclaimer, the term of this patent is extended or adjusted under 35 U.S.C. 154(b) by 0 days.

(21) Appl. No.: 14/860,502

(22) Filed: Sep. 21, 2015

(65) Prior Publication Data

US 2016/0229289 A1    Aug. 11, 2016

Related U.S. Application Data

(60) Provisional application No. 62/052,664, filed on Sep. 19, 2014.

(51) Int. Cl.
| | |
|---|---|
| *B60K 17/08* | (2006.01) |
| *F16H 57/021* | (2012.01) |
| *F16H 57/031* | (2012.01) |
| *F16H 3/091* | (2006.01) |
| *B60K 17/22* | (2006.01) |
| *B60K 1/02* | (2006.01) |
| *F16H 57/02* | (2012.01) |

(52) U.S. Cl.
CPC .............. *B60K 17/08* (2013.01); *B60K 1/02* (2013.01); *B60K 17/22* (2013.01); *F16H 3/091* (2013.01); *F16H 57/021* (2013.01); *F16H 57/031* (2013.01); *F16H 2057/02008* (2013.01); *F16H 2057/0216* (2013.01)

(58) Field of Classification Search
CPC .......... B60K 17/08; B60K 1/02; B60K 17/22; F16H 3/091; F16H 57/021; F16H 57/031; F16H 2057/0216; F16H 2057/02008
See application file for complete search history.

(56) References Cited

U.S. PATENT DOCUMENTS

| | | | |
|---|---|---|---|
| 6,820,707 B1 * | 11/2004 | Cantemir | ............... B60T 1/062 180/65.6 |
| 8,985,255 B2 | 3/2015 | Frohnmayer et al. | |

(Continued)

*Primary Examiner* — Drew Brown
(74) *Attorney, Agent, or Firm* — Michael J. Andri

(57) ABSTRACT

A dual-independent powertrain for a vehicle includes a transmission enclosure that houses a first transmission and a second transmission that are mechanically decoupled from each other. The enclosure includes a central frame, a first enclosure cover that interfaces with the central frame to collectively define a first transmission region on a first side of the central frame, and a second enclosure cover that interfaces with the central frame to collectively define a second transmission region on a second side of the central frame. The first transmission is housed within the first transmission region, and the second transmission is house within the second transmission region. Each transmission includes a motor-interfacing shaft that interfaces with a respective electric motor, a drive-interfacing shaft that interfaces with a respective drive wheel of a vehicle, and a multi-stage gear train mechanically coupling the motor-interfacing shaft and the drive-interfacing shaft.

19 Claims, 7 Drawing Sheets

(56) References Cited

U.S. PATENT DOCUMENTS

| | | | |
|---|---|---|---|
| 2005/0067199 A1* | 3/2005 | Shimizu | B60L 15/2045 |
| | | | 180/65.1 |
| 2011/0177903 A1* | 7/2011 | Campbell | B60K 7/0007 |
| | | | 475/149 |
| 2011/0259657 A1 | 10/2011 | Fuechtner | |
| 2012/0052995 A1 | 3/2012 | Scarbo et al. | |
| 2013/0116087 A1* | 5/2013 | Ichikawa | B60K 5/08 |
| | | | 477/79 |
| 2016/0039277 A1* | 2/2016 | Falls | B60K 1/02 |
| | | | 180/62 |

\* cited by examiner

US 9,592,732 B2

VEHICLE POWERTRAIN WITH DUAL-INDEPENDENT TRANSMISSIONS

CROSS REFERENCE TO RELATED APPLICATIONS

This application is a non-provisional of and claims priority to U.S. provisional patent application Ser. No. 62/052,664, filed Sep. 19, 2014, and titled "Single Ratio Parallel Electric Vehicle Powertrain Device", the entire contents of which is herein incorporated by reference for all purposes.

BACKGROUND

Vehicles include a powertrain to mechanically couple one or more drive wheels with a drive source, such as an electric motor or a combustion engine. A powertrain typically includes a transmission, and may additionally include the drive source, the drive wheels, and other intervening components.

SUMMARY

In one aspect of the disclosed subject matter, a dual-independent powertrain for a vehicle includes a transmission enclosure that houses a first transmission and a second transmission that are mechanically decoupled from each other. The enclosure includes a central frame, a first enclosure cover that interfaces with the central frame to collectively define a first transmission region on a first side of the central frame, and a second enclosure cover that interfaces with the central frame to collectively define a second transmission region on a second side of the central frame. The first transmission is housed within the first transmission region, and the second transmission is house within the second transmission region. Each transmission includes a motor-interfacing shaft that interfaces with a respective electric motor, a drive-interfacing shaft that interfaces with a respective drive wheel of a vehicle, and a multi-stage gear train mechanically coupling the motor-interfacing shaft and the drive-interfacing shaft. A respective electric motor interfaces with each motor-interfacing shaft and a respective drive wheel interfaces with each drive-interfacing shaft to provide a dual-independent powertrain in which each motor is located on the same side of the central frame from the drive wheel with which that motor is mechanically coupled.

In another aspect of the disclosed subject matter, a dual-independent powertrain for a vehicle includes a transmission enclosure that houses a first transmission and a second transmission that are mechanically decoupled from each other. Each transmission includes a motor-interfacing shaft that interfaces with a respective electric motor, a drive-interfacing shaft that interfaces with a respective drive wheel of a vehicle, and a multi-stage gear train mechanically coupling the motor-interfacing shaft and the drive-interfacing shaft. The motor-interfacing shaft and the drive-interfacing shaft of each transmission are located on an opposite side of the central frame from each other. A respective electric motor interfaces with each motor-interfacing shaft and a respective drive wheel interfaces with each drive-interfacing shaft to provide a dual-independent powertrain in which each motor is located on an opposite side of the central frame from the drive wheel with which that motor is mechanically coupled.

DETAILED DESCRIPTION

Figure 1:
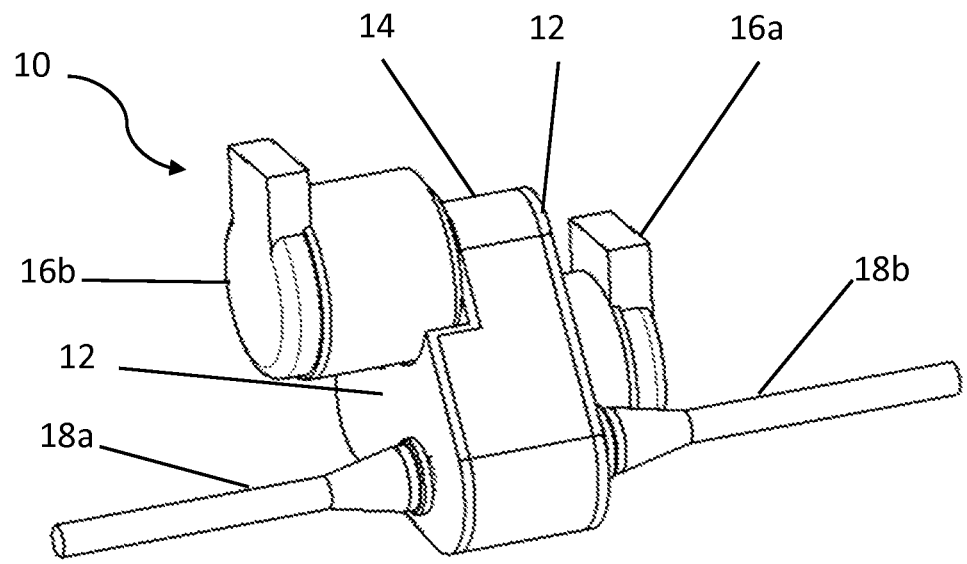
FIG. 1 is a perspective view an example dual-independent powertrain.
Figure 2:
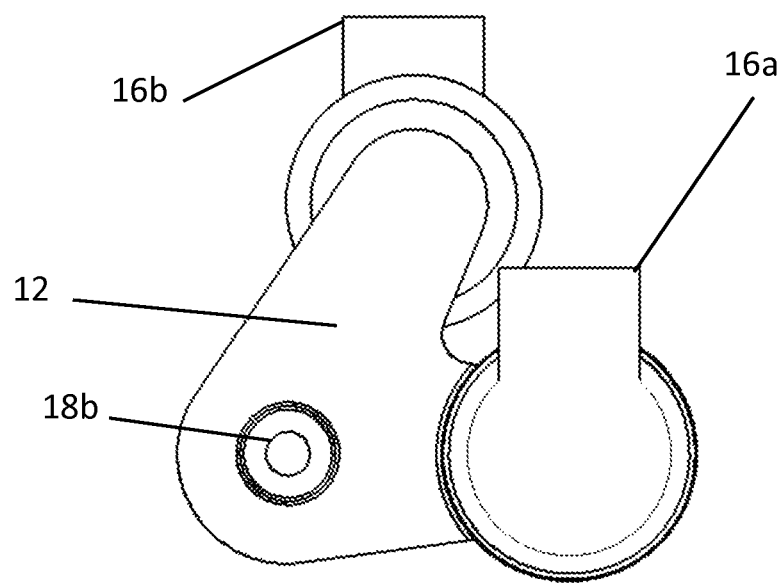
FIG. 2 is a side view of the powertrain of FIG. 1.

The dual-independent powertrains disclosed herein enable two drive sources (e.g., two electric motors) to each provide parallel and independent drive capability to different wheels of a vehicle via respective transmissions. The dual-independent powertrains may include operationally symmetric transmissions that utilize many of the same components to provide a cost effective vehicle-based solution that supports features such as traction control, anti-lock braking, and regenerative braking by way of independent control of the drive sources, transmissions, and drive wheels. The dual-independent powertrains may be configured to provide a compact design that utilizes the same or similar parts in each transmission component to reduce the overall cost and complexity of the powertrain.

In one aspect of the disclosed subject matter, a dual-independent powertrain for a vehicle includes a transmission enclosure that houses a first transmission and a second transmission that are mechanically decoupled from each other. The enclosure includes a central frame, a first enclosure cover that interfaces with the central frame to collectively define a first transmission region on a first side of the central frame, and a second enclosure cover that interfaces with the central frame to collectively define a second transmission region on a second side of the central frame. The first transmission is housed within the first transmission region, and the second transmission is house within the second transmission region. Each transmission includes a motor-interfacing shaft (also referred to as an axle) that interfaces with a respective electric motor, a drive-interfacing shaft that interfaces with a respective drive wheel of a vehicle, and a multi-stage gear train mechanically coupling the motor-interfacing shaft and the drive-interfacing shaft. A respective electric motor interfaces with each motor-interfacing shaft and a respective drive wheel interfaces with each drive-interfacing shaft to provide a dual-independent powertrain in which each motor is located on the same side of the central frame from the drive wheel with which that motor is mechanically coupled.

In another aspect of the disclosed subject matter, a dual-independent powertrain for a vehicle includes a transmission enclosure that houses a first transmission and a second transmission that are mechanically decoupled from each other. Each transmission includes a motor-interfacing shaft that interfaces with a respective electric motor, a drive-interfacing shaft that interfaces with a respective drive wheel of a vehicle, and a multi-stage gear train mechanically coupling the motor-interfacing shaft and the drive-interfacing shaft. The motor-interfacing shaft and the drive-interfacing shaft of each transmission are located on an opposite side of the central frame from each other. A respective electric motor interfaces with each motor-interfacing shaft and a respective drive wheel interfaces with each drive-interfacing shaft to provide a dual-independent powertrain in which each motor is located on an opposite side of the central frame from the drive wheel with which that motor is mechanically coupled.

FIG. 1 depicts an example dual-independent powertrain 10. In at least some implementations, the powertrain 10 includes two substantially identical and/or symmetric enclosure covers 12, a first electric motor 16a, a second electric motor 16b, a central housing 14 (also referred to herein as a central frame), a first output shaft 18a and a second output shaft 18b (also referred to herein as drive-interfacing shafts or drive shafts). The covers 12 are depicted in FIG. 1 as separate components from the central housing 14. This configuration may be desirable in order to provide access to the central housing 14. However, in alternative configurations, the covers 12 and central housing 14 may be a single component.

Referring to the central housing 14 in further detail, the central housing 14 is sufficiently wide and long to house a first gear train 20a and a second gear train 20b. The particular ratio of the gear train 20 may vary and can be selected for the particular application for which powertrain 10 is used. The covers 12 are dimensioned to fit against the central housing 14 and are fastened to the central housing 14 to provide a fluid tight enclosure for the first and second gear train 20a, 20b that is suitable for holding a transmission oil or fluid. The central housing 14 has a central plane 15 that extends through it.

Referring to the covers 12 in more detail, the covers 12 may be designed to rigidly fix or otherwise secure the first and second motors 16a, 16b relative to the central housing 14. Additionally, the covers 12 also provide for efficient function of the first and second motors 16a, 16b by increasing the stiffness of the powertrain 10. In alternative configurations, the first and second motors 16a, 16b may directly mount to the central housing 14.

Referring to the covers 12 and central housing 14 in more detail, these elements may be made of any sufficiently rigid and strong material such as aluminum, steel, high-strength alloys, or composites. The first and second gear train 20a, 20b, may be made of any materials that are suitable for use according to the power demands on the powertrain 10. Non-limiting examples of materials include, plastics including nylon, steel, cast iron, or other materials commonly used in powertrain construction.

Additional maintenance features of the powertrain 10 may be incorporated into the central housing 14 and/or covers 12 to facilitate the filling and removal of transmission oil or fluid (e.g., gear oil), monitor the amount of oil or fluid, and provide cooling fins or heat sinks to reduce the operating temperature of the oil or fluid. Oil or fluid may be held within the region or region(s) enclosed by the covers 12 and central housing 14 via a tight seal created between the covers 12 and the central housing 14, which may include one or more perimeter sealing gaskets.

Figure 3:
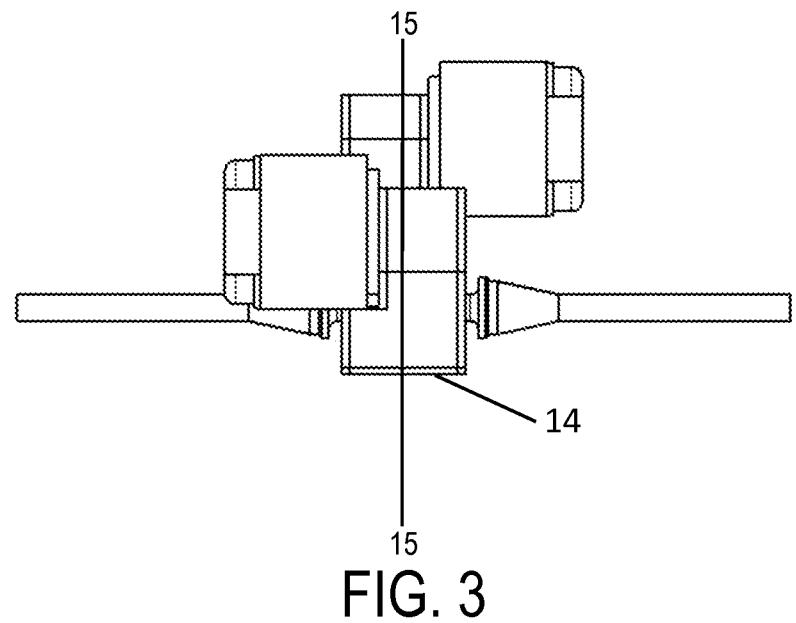
FIG. 3 is a top view of the powertrain of FIG. 1.

Operationally, the powertrain is symmetrical in function about central plane 15 shown in FIG. 3. Plane 15 may refer to a plane parallel to the sides of the central housing 14 and equidistant from the cover 12 mounting face on either side of the central housing 14. Thus, plane 15 is a central plane for the central housing 14 and/or the overall powertrain.

Figure 4:
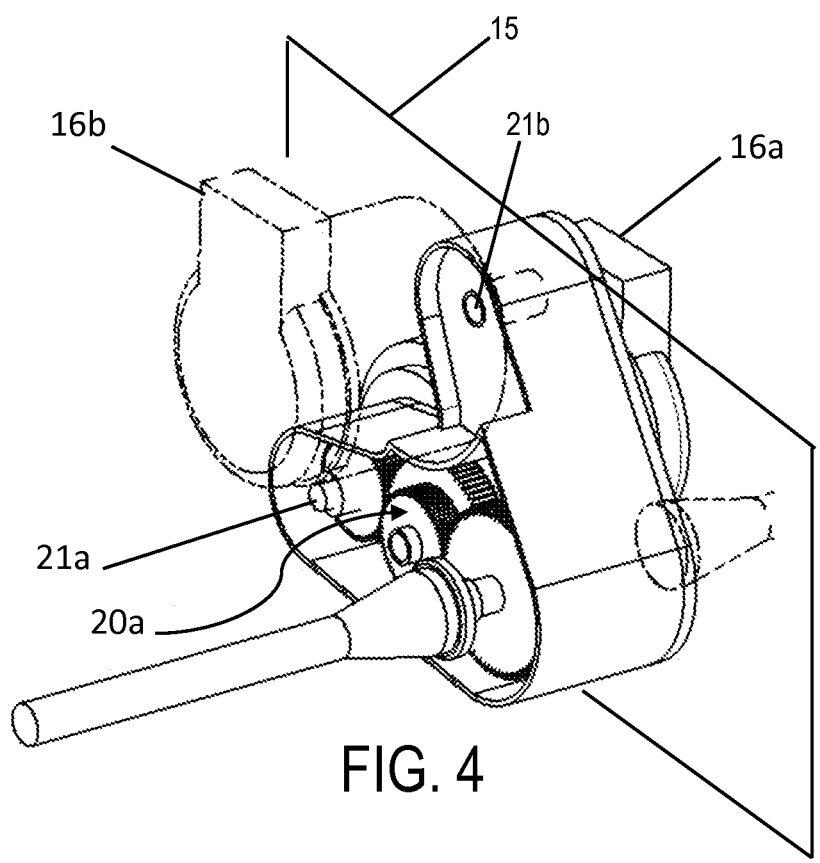
FIG. 4 is a perspective view of the powertrain of FIG. 1 with an enclosure cover removed.

Referring to the first powertrain 20a in more detail, FIG. 4 discloses the parallel electric powertrain 10 of FIG. 1 with the cover 12 nearest to the first gear train 20a removed. Shown within the central housing 14, is the first gear train 20a. Notably, the particular number and arrangement of gears shown in FIG. 4 is simply an exemplary arrangement. The configuration of gears will vary depending upon the desired ratio and the particular end use of the parallel electric powertrain 10. There are many variations of gear trains that are suitable for use with the invention, and a person skilled in the art would understand the modification of the gear train for a particular use. Additionally, although gears are shown in the embodiment depicted in FIG. 4, a belt with pulleys would also be suitable and is considered within the scope of this disclosure.

The first gear train 20a mechanically couples and transmits power between the first electric motor 16a and the first output shaft 18a (referred to as a drive-interfacing shaft or a drive shaft integrated with a drive-interfacing shaft of the transmission or gear train). In the view shown in FIG. 4, the first electric motor output shaft 21a (referred to as a motor shaft or a motor shaft integrated with a motor-interfacing shaft of the transmission or gear train) extends from the first electric motor 20a through plane 15 of the central housing 14. The first electric motor output shaft 21a is operable for driving the first gear train 20a and thereby operating the first output shaft 18a. The same configuration may be used for the second electric motor 16b, which is mechanically coupled with and drives a second output shaft 18b via a second gear train 20b and motor output shaft 21b. Thus, in the configuration of powertrain 10, a first electric motor 16a located on a first side of the central plane drives a non-collinearly located first output shaft 18a located on an opposite second side of the central plane, and a second electric motor 16b located on the second side of the central plane opposite the first electric motor 16a drives a non-collinearly located second output shaft 18b on the first side of the central plane opposite the second electric motor 16b. Also in this configuration, motor output shafts 21a, b are not collinear with each other, whereas output shafts 18a, 18b are collinear with each other.

Referring to the first gear train 20a and second gear train 20b in more detail, the first gear train 20a and second gear train 20b each define a direction between the respective electric motor output shaft and output shaft which is coupled by the respective gear train. These directions, define a first direction associated with the first gear train 20a and a second direction associated with the second gear train 20b. When transposed on to plane 15, the first direction and second direction define an interior angle. The angle may range between just greater than 0 degrees and 180 degrees. The dual-independent powertrains disclosed herein encompass configurations in which the angle is 180 degrees which places the first electric motor 16a and second electric motor 16b at a maximum distance for a given gear train lengths and provides a flat profile for the parallel electric powertrain 10. In an example configuration, the gear train angle is less than 90 degrees (referred to as a folded configuration). A gear train angle less than 90 degrees provides a parallel electric powertrain 10 with a smaller volume, which is desirable in certain applications.

Figure 5:
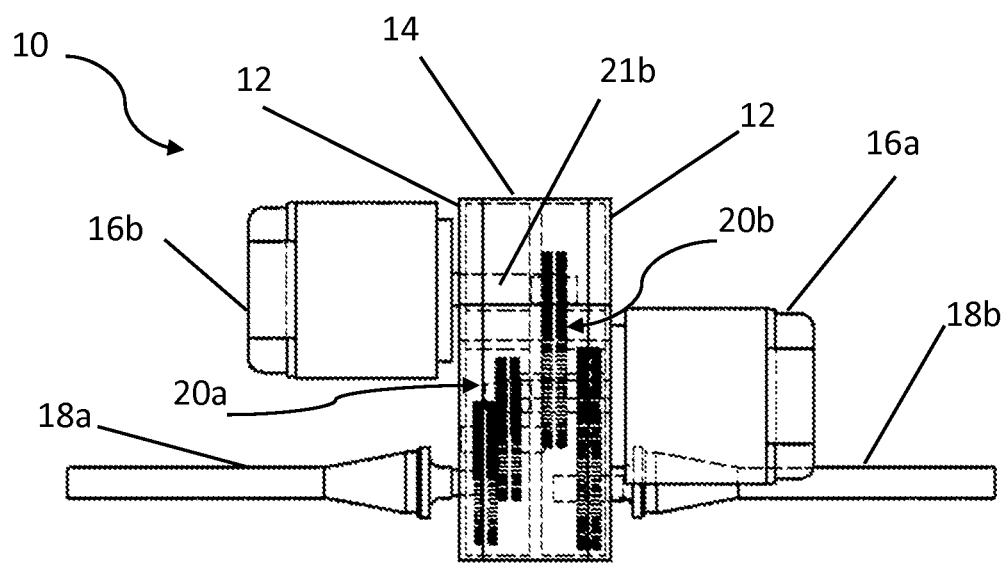
FIG. 5 is a top view of the powertrain of FIG. 1 with hidden features shown as dashed lines.

In FIGS. 4 and 5, hidden features are depicted with dashed lines. FIG. 5 depicts a top view of powertrain 10 with dashed lines showing hidden features of first gear train 20a and second gear train 20b. Depicted with dashed lines is the first gear train 20a which rotationally couples the first electric motor 16a to the first output shaft 18a, and the second gear train 20b which rotationally couples the second electric motor 16b to the second output shaft 18b.

Figure 6:
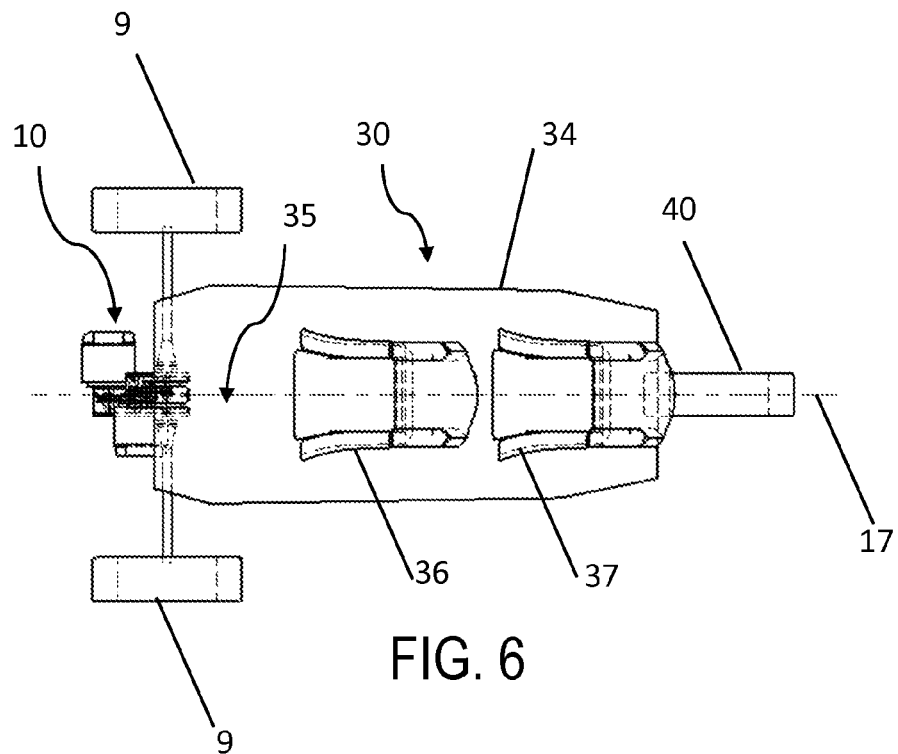
FIG. 6 is a top view of an example vehicle that includes the powertrain of FIG. 1.
Figure 7:
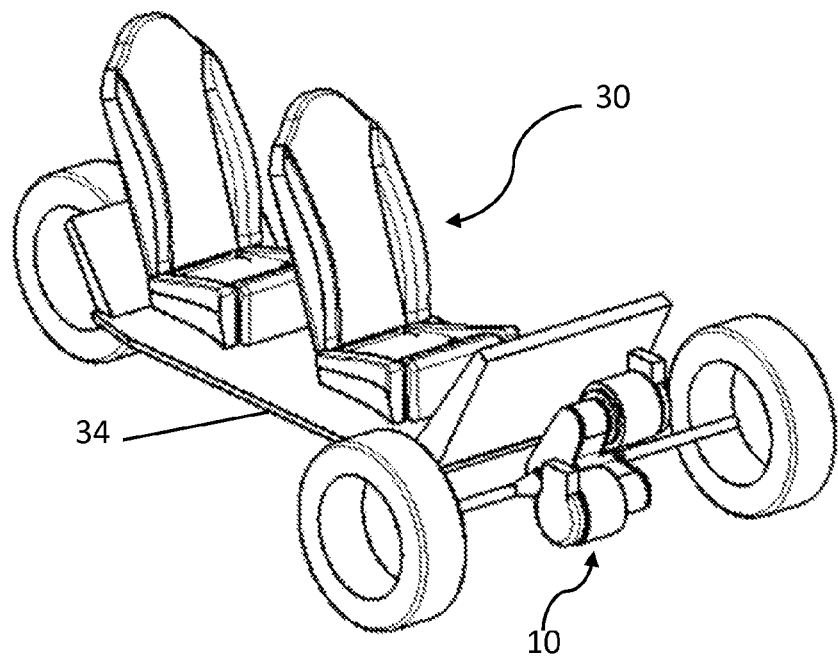
FIG. 7 is a perspective view of the vehicle of FIG. 6 that includes the powertrain of FIG. 1.

FIGS. 6 and 7 depict an example vehicle 30 that includes powertrain 10. Vehicle 30 is a non-limiting example of a vehicle that is suitable for use with the dual-independent powertrains disclosed herein. It will be understood that other types of vehicles may be used in combination with the dual-independent powertrains disclosed herein.

Vehicle 30 includes a chassis 34 (also referred to as a vehicle frame) for support of powertrain 10 and the vehicle's occupants. Operator seat 36 and passenger seat 37 are positioned such that the passenger seat is directly behind the operator seat. Alternatively the passenger seat 37 may not be provided so as to add more storage capacity to the vehicle. The operator and passenger seats 36, 37 may be positioned closer together than the front and rear seats of a conventional automobile in order to provide a smaller vehicle footprint on the road. The operator seat may be narrower in parts than a conventional automotive seat to allow the passenger's legs to comfortably straddle the operator seat. A foot well 35 within the forward center area of the chassis 34 allows for comfortable driver foot placement while lowering the driver seat. The chassis may be formed of sheet material, tube steel, composites, corrugated plastics or other suitable material.

Two front wheels 39 positioned at or near the front of the vehicle are each independently driven by one of the respective output shafts from a dual-independent powertrain, such as powertrain 10, for example. In this configuration, powertrain is powered by electric motors, which are powered by one or more energy storage devices. An energy storage device may include a series or group of battery modules. Alternatively, other suitable energy storage devices may be used within the context of electric motors, such as a fuel cell. An individual rear wheel 40 is positioned along plane 17 at or near the rear of the vehicle. Plane 17 is defined as a plane positioned at a centerline or middle of the chassis 34 along a long axis of the vehicle. Chassis 34 may be symmetrical about plane 17.

The components of the powertrain (including the drive sources of the overall propulsion system of the vehicle) are arranged so as to provide ballast for stability on the three-wheeled platform depicted in FIGS. 6 and 7. Powertrain 10 has a center of mass that is positioned closer to the front of the vehicle 30 than the axis defined by the first and second output shafts 18a, 18b and is lower to the ground than the center of mass of the chassis. In a preferred example at least 25% of the weight of the powertrain 10 may be positioned at a level below the center of gravity of the chassis 34.

Figure 8:
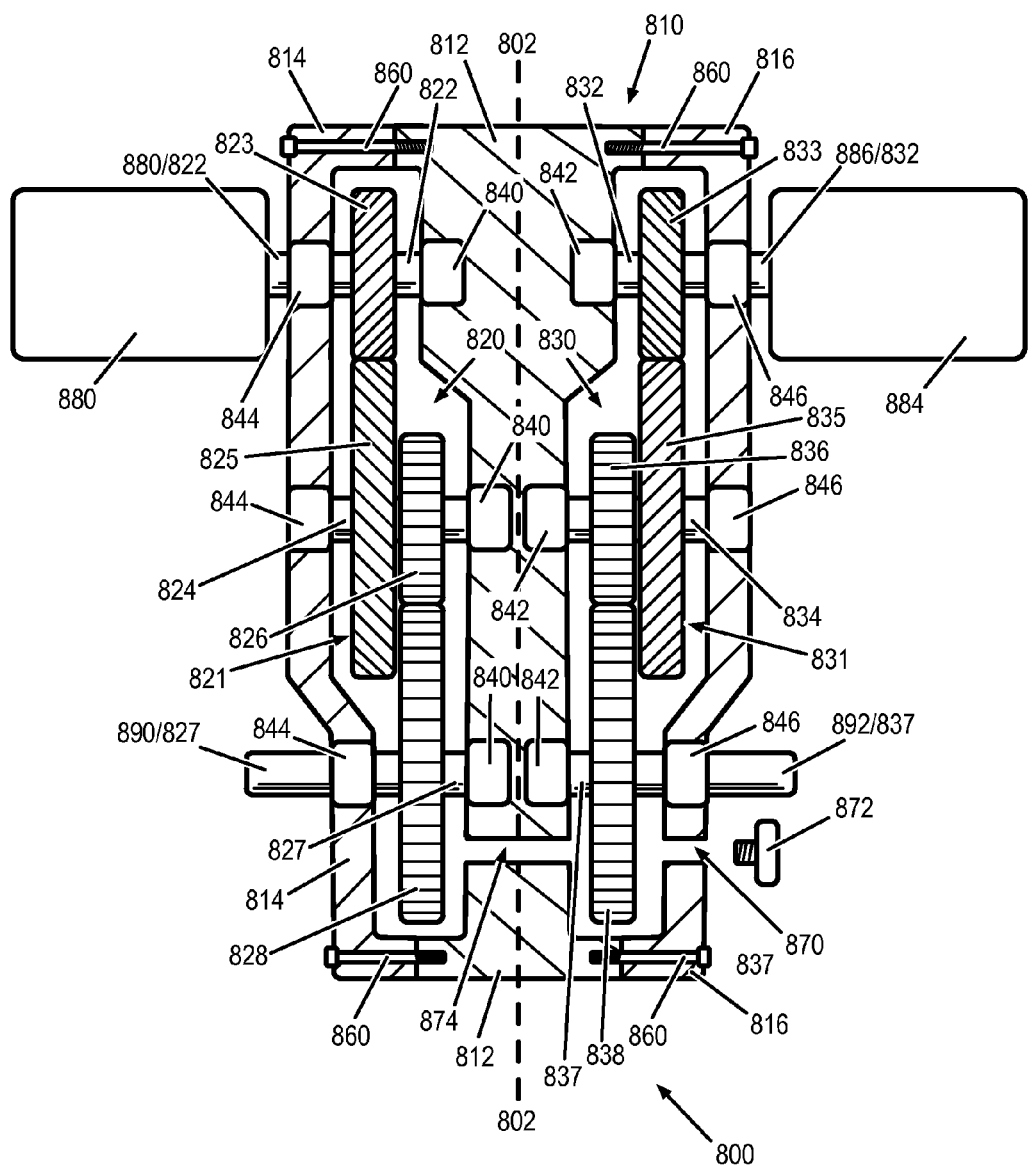
FIG. 8 depicts an internal view of another example dual-independent powertrain.

The previously described powertrain 10 is a non-limiting example of a dual-independent powertrain that may be incorporated into a vehicle. FIG. 8 depicts an internal view of another example dual-independent powertrain 800 that may be incorporated into a vehicle. In contrast to powertrain 10, which included motor shafts or motor-interfacing shafts that were non-collinear, powertrain 800 is symmetric about a central plane 802. Powertrain 800 similarly includes a dual-independent transmission enclosure 810 that houses two transmissions that are mechanically decoupled from each other. It will be understood that aspects of previously described powertrain 10 may be used in combination with powertrain 800. For example, the various materials, assembly techniques, and vehicle integration approaches described herein with respect to powertrain 10 may be applied to powertrain 800.

Enclosure 810 includes a central frame 812, a first enclosure cover 814, and a second enclosure cover 816. First enclosure cover 814 interfaces with central frame 812 to collectively define a first transmission region 820 of enclosure 810 on a first side of central frame 812. Second enclosure cover 816 interfaces with central frame 812 to collectively define a second transmission region 820 of enclosure 810 on a second side of central frame 812, opposite the first transmission region 820. First and second transmission regions may form separate or combined fluid-tight spaces in combination with central frame 812.

A first transmission 821 is housed within first transmission region 820 of enclosure 810. First transmission 821 includes a first motor-interfacing shaft 822, a first drive-interfacing shaft 827, and a first multi-stage gear train mechanically coupling the first motor-interfacing shaft 822 and the first drive-interfacing shaft 827. The first multi-stage gear train of first transmission 821 may include two or more speed reduction stages in an example configuration, such as depicted in FIG. 8.

A second transmission 831 is housed within second transmission region 830 of enclosure 810. Second transmission 831 includes a second motor-interfacing shaft 832, a second drive-interfacing shaft 837, and a second multi-stage gear train mechanically coupling the second motor-interfacing shaft 832 and the second drive-interfacing shaft 837. The second multi-stage gear train of second transmission 831 may also include two or more speed reduction stages.

Central frame 812 is located along a central plane 802 of the enclosure and is disposed between first enclosure cover 814 and second enclosure cover 816. In this example, first transmission 821 and second transmission 831 are symmetric about the central plane, and each provide the same gear ratio and the same speed reduction. Second transmission 831 is mechanically decoupled from first transmission 821 to provide dual-independent powertrain components.

Powertrain 800 may further include or may interface with a first electric motor 880 including a first motor shaft 882 coupled to or integrated with first motor-interfacing shaft 822, and a second electric motor 884 including a second motor shaft 886 coupled to or integrated with second motor-interfacing shaft 832. It will be understood that powertrain 800 may not include or may be provided without the two drive sources, such as electric motors 880 and 884. Furthermore, powertrain 800 may include or may be combined with other suitable drive sources, including combustion engines.

A non-limiting advantage of using electric motors with the dual-independent powertrains disclosed herein is the ability for the first and second transmissions to have a single or fixed gear ratio, as further enabled by the more constant and broader speed vs. torque relationship of electric motors as compared to combustion engines. This single or fixed gear ratio may enable reduction in size, weight, cost, and complexity of each transmission individually as well as the overall size, weight, cost, and complexity of the powertrain.

Powertrain 800 may further include or may interface with a first drive wheel that is coupled to or otherwise fixed to first drive-interfacing shaft 827, and a second drive wheel coupled to or otherwise fixed to second drive-interfacing shaft 837. In some examples, drive wheels may be mechanically coupled with drive-interfacing shafts via an intervening drive shaft and/or other intervening components. FIGS. 6 and 7 depict non-limiting examples of drive wheels of a vehicle that may be coupled to first and second drive-interfacing shafts 827 and 837. It will be understood that powertrain 800 may be used in other types of vehicles, and that each of first and second drive-interfacing shafts 827 and 837 may optionally be mechanically coupled with two or more drive wheels.

First motor-interfacing shaft 822 and first drive-interfacing shaft 827 are located on an opposite side of central frame 812 from second motor-interfacing shaft 832 and second drive-interfacing shaft 837. In the example depicted in FIG. 8, each of first motor-interfacing shaft 822, first drive-interfacing shaft 827, second motor-interfacing shaft 832, and second drive-interfacing shaft 837 are parallel to each other. In symmetric configurations of powertrain 800, first drive-interfacing shaft 822 and second drive-interfacing shaft 832 are collinear, and first motor-interfacing shaft 827 and second motor-interfacing shaft 837 are collinear. Also in symmetric configurations motor shafts 882 and 886 are parallel to each other and collinear.

In at least some examples, first transmission 821 takes the form of a first multi-stage gear train that includes a first larger intermediate gear 825 and a first smaller intermediate gear 826 fixed to a first intermediate shaft 824. In other examples, first transmission 821 may take the form of a single stage gear train or a multi-stage gear train having three or more stages.

The first multi-stage gear train of this example further includes a first motor-side gear 823 fixed to first motor-interfacing shaft 822 that meshes with first larger intermediate gear 825. In the example depicted in FIG. 8, first motor-side gear 823 is smaller than first larger intermediate gear 825, which provides a first stage of speed reduction from first motor-interfacing shaft 822 to first intermediate shaft 824. The first multi-stage gear train of this example further includes a first drive-side gear 828 fixed to first drive-interfacing shaft 827 that meshes with first smaller intermediate gear 826. In the example depicted in FIG. 8, first drive-side gear 828 is larger than first smaller intermediate gear 826, which provides a second stage of speed reduction from first intermediate shaft 824 to first drive-interfacing shaft 827.

Second transmission 831 may also takes the form of a second multi-stage gear train that includes a second larger intermediate gear 835 and a second smaller intermediate gear 836 fixed to a second intermediate shaft 834. In other examples, second transmission 831 may take the form of a single stage gear train or a multi-stage gear train having three or more stages, and may be the same as the first transmission 821. In a symmetric configuration between first and second transmissions 821 and 831, first larger intermediate gear 825 and second larger intermediate gear 835 are the same size (and have the same quantity and configuration of teeth), and first smaller intermediate gear 826 and second smaller intermediate gear 836 are the same size (and have the same quantity and configuration of teeth).

The second multi-stage gear train of this example further includes a second motor-side gear 833 fixed to second motor-interfacing shaft 832 that meshes with second larger intermediate gear 835. In a symmetric configuration, first motor-side gear 823 and second motor-side gear 833 are the same size (and have the same quantity and configuration of teeth). In the example depicted in FIG. 8, second motor-side gear 833 is smaller than second larger intermediate gear 835, which provides a first stage of speed reduction from second motor-interfacing shaft 832 to second intermediate shaft 834. The second multi-stage gear train of this example further includes a second drive-side gear 838 fixed to second drive-interfacing shaft 837 that meshes with second smaller intermediate gear 836. In a symmetric configuration between first and second transmissions 821 and 831, first drive-side gear 828 and second drive-side gear 838 are the same size (and have the same quantity and configuration of teeth). In the example depicted in FIG. 8, second drive-side gear 838 is larger than second smaller intermediate gear 836, which provides a second stage of speed reduction from second intermediate shaft 834 to second drive-interfacing shaft 837.

In the example depicted in FIG. 8, each of the motor-side gears 823 and 833 are helical gears and each of the larger intermediate gears 825 and 835 are helical gears. Helical gears may be more suitable than spur gears at this first speed reduction stage to accommodate higher speeds. Also in the example depicted in FIG. 8, each of the drive-side gears 828 and 838 are spur gears, and each of the smaller intermediate gears 826 and 836 are spur gears. Spur gears may be suitable at this second speed reduction stage following speed reduction by the first speed reduction stage. It will be understood that the above examples are non-limiting, and any or all of the gears may be spur gears, helical gears, or other suitable gear types in other implementations.

Each of the shafts or axles described herein may be supported by one or more rotational bearings. Such bearings may take the form of thrust bearings in some examples. Bearings may include or may interface with one or more seals to provide a fluid-tight or fluid leak-resistive boundary in combination with a shaft or axle.

Central frame 812 includes a first set of bearings 840 on the first side of the central frame that respectively support and enable rotation of first motor-interfacing shaft 822, first drive-interfacing shaft 827, and intermediate shaft(s) such as first intermediate shaft 824. Central frame includes a second set of bearings 842 on the second side of the central frame that respectively support and enable rotation of second motor-interfacing shaft 832, second drive-interfacing shaft 837, and intermediate shaft(s) such as second intermediate shaft 834.

First enclosure cover 814 includes a set of bearings 844 that respectively support and enable rotation of first motor-interfacing shaft 822 (or a first motor shaft 880 coupled with shaft 822), first drive-interfacing shaft 827 (or a first drive shaft 890 coupled with shaft 927), and intermediate shaft(s) such as first intermediate shaft 824. Second enclosure cover 834 includes a set of bearings 846 that respectively support and enable rotation of second motor-interfacing shaft 832 (or a second motor shaft 886 coupled with shaft 832), second drive-interfacing shaft 837 (or a second drive shaft 892 coupled with shaft 837), and intermediate shaft(s) such as second intermediate shaft 834. Each of the bearings of the enclosure covers that support motor-interfacing shafts, motor shafts, drive-interfacing shafts, or drive shafts that protrude from the internal transmission regions of the enclosure through the enclosure covers may be arranged within respective openings formed in the enclosure covers to provide external access to the shafts. Such bearings may include or interface with one or more seals to retain transmission oil or fluid within the internal transmission regions.

In the example depicted in FIG. 8, central frame 812 defines or otherwise includes one or more openings or pathways 874 that enable fluid communication between first transmission region 820 and second transmission region 830 to provide a shared fluid region. In this example, the shared fluid region may be accessed via an opening or pathway (e.g., a fill spout) that is defined or included on an exterior wall of enclosure 810. As an example, a transmission fluid or oil may be added via opening 870 formed in an enclosure cover, such as second enclosure cover 816 (or alternatively enclosure 814 or central frame 810), and a cap 872 may be used to seal opening 870. In examples where a shared fluid region is formed by first transmission region 820 and second transmission region 830 via an opening or pathway in central frame 812, a single fill spout and a single fill operation may be used to collectively supply transmission oil or fluid to both transmission regions. The single fill spout or optionally a separate single drain spout may enable the oil or fluid to be collectively removed from the first and second transmission regions with a single drain operation. These features may be similarly incorporated into previously described powertrain 10 of FIGS. 1-7.

Figure 9:
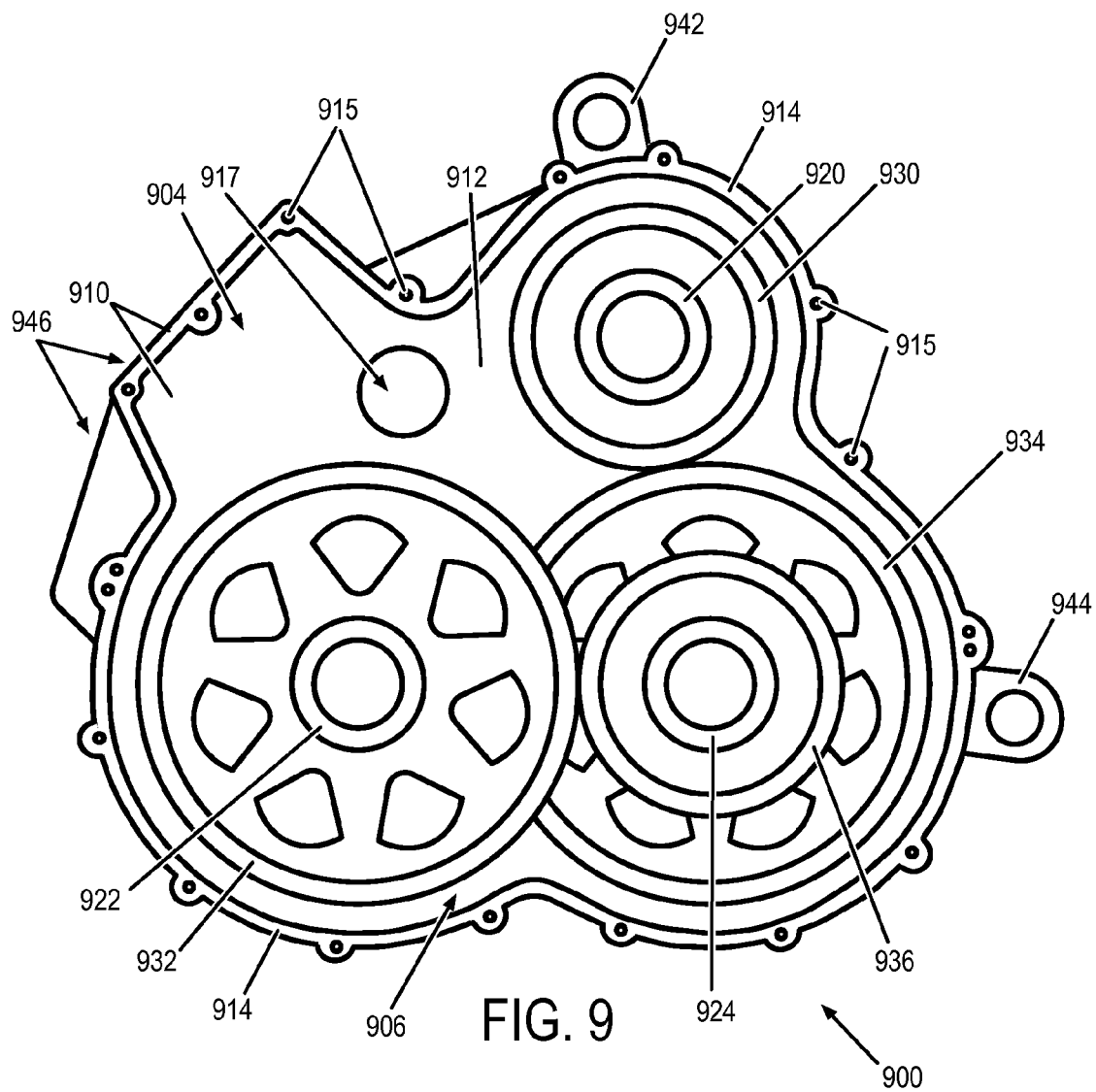
FIG. 9 depicts a side view of an example dual-independent powertrain with an enclosure cover removed.
Figure 10:
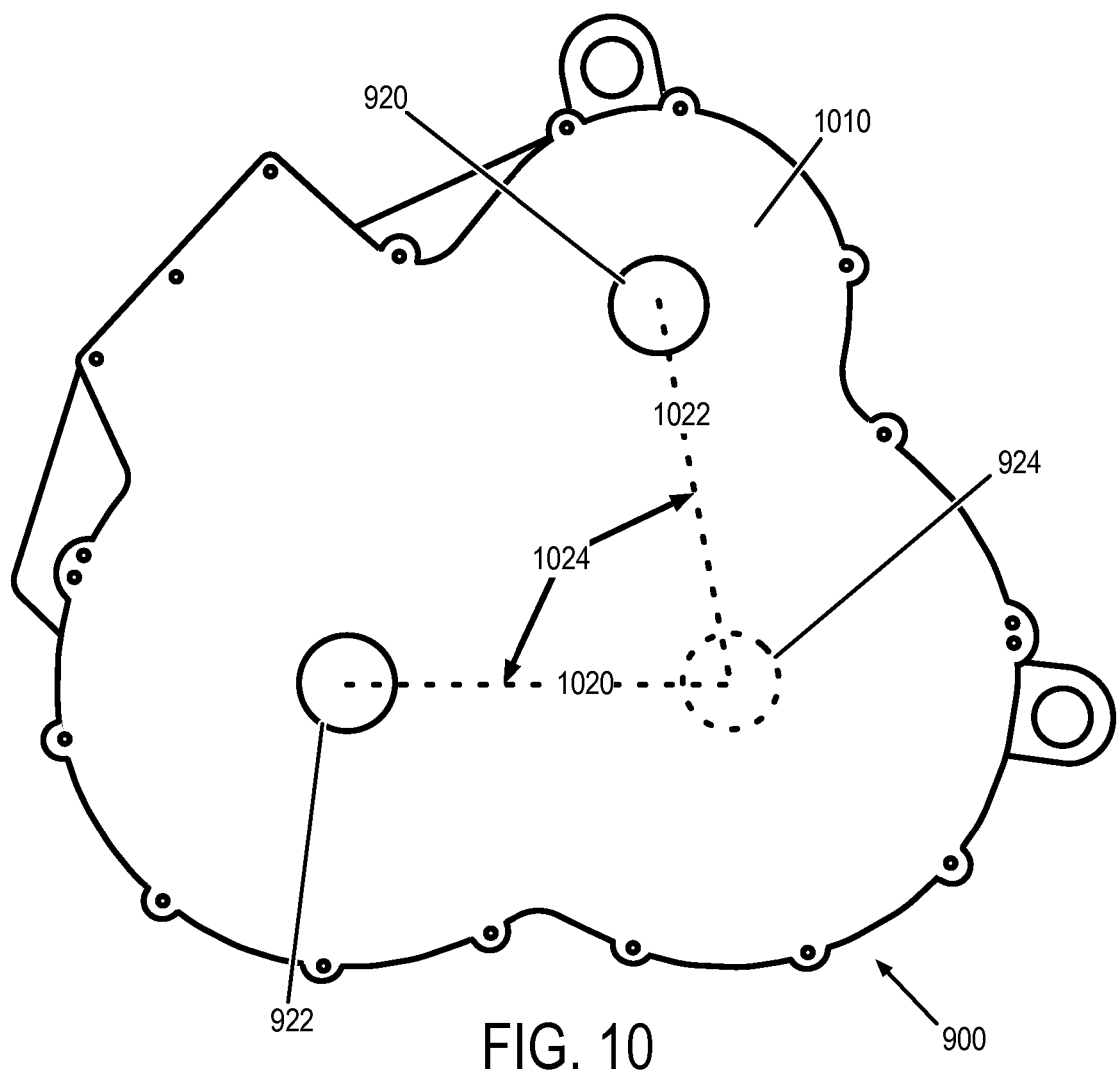
FIG. 10 depicts a side view of the powertrain of FIG. 9 with the enclosure cover installed.

In at least some configurations, first enclosure cover 814 and second enclosure cover 816 may be secured to opposite sides of central frame 812 by way of one or more fasteners 860. FIG. 8 depicts an example in which bolts that are threaded into threaded holes in the central frame are used to secure the enclosure covers to the central frame. This feature may be similarly incorporated into powertrain 10. FIGS. 9 and 10 depicts another view of an example powertrain in which fasteners (e.g., bolts) are used around a perimeter of an enclosure cover to secure the enclosure cover to a central frame.

FIG. 9 depicts a side view of an example dual-independent powertrain 900 with an enclosure cover removed to reveal internal components. Powertrain 900 is a non-limiting example of previously described powertrain 800 of FIG. 8. Accordingly, powertrain 900 includes two independent transmissions. FIG. 10 depicts powertrain 900 with an enclosure cover 1010 installed.

A central frame 910 of powertrain 900 includes a central wall 912 and a rim 914 that defines a portion of a transmission region 904 within which transmission 906 is housed. Central frame 910 is a non-limiting example of central frame 812 of FIG. 8. Rim 914 interfaces with a corresponding enclosure cover 1010 depicted in FIG. 10. Enclosure cover 1010 is a non-limiting example of enclosure covers 814 and 816 of FIG. 8. Rim 914 includes openings 915 (e.g., threaded holes) formed therein to receive fasteners (e.g., threaded bolts) that secure enclosure cover 1010 to central frame 910. Central wall 912 may have one or more openings or channels 917 formed therein that enable fluid to be exchanged with another transmission region located on an opposite side of the central wall. It will be understood that opening/channel 917 is a non-limiting example, and that one, two or more openings or channels may be used that have different locations from the location depicted in FIGS. 8 and 9.

Central wall 912 may include or otherwise accommodate a set of bearings that support and enable rotation of a motor-interfacing shaft 920, a drive-interfacing shaft 922, and optionally one or more intermediate shafts, such as intermediate shaft 924. Motor-interfacing shaft 920 is a non-limiting example of motor-interfacing shafts 822 and 832 of FIG. 8 that interfaces with an electric motor or other suitable drive source. Drive-interfacing shaft 922 is a non-limiting example of drive-interfacing shafts 827 and 837 of FIG. 8 that interfaces with a drive wheel. Intermediate shaft 924 is a non-limiting example of intermediate shafts 824 and 834.

Transmission 906 in FIG. 9 provides speed reduction from a drive source to a drive shaft by way of a fixed-ratio multi-stage gear train. In FIG. 9, gears are depicted in simplified form, and may have any suitable quantity of teeth and relative sizing.

Motor-interfacing shaft 920 includes a motor-side gear 930 fixed thereon or integrated with the gear. Motor-side gear 930 is a non-limiting example of motor-side gears 823 and 833 of FIG. 8. Drive-interfacing shaft 922 includes a drive-side gear 932 fixed thereon or integrated with the gear. Drive-side gear 932 is a non-limiting example of drive-side gears 828 and 838 of FIG. 8. Intermediate shaft 924 includes a larger intermediate gear 934 and a smaller intermediate gear 936 fixed thereon or integrated with the gears.

Central frame 910 may include a variety of mounting elements (e.g., 940 and 942) and/or mounting surfaces (e.g., 944) to mount the powertrain 900 to a frame or chassis of a vehicle or other object.

Within FIG. 10, an example spatial relationship between the various shafts or axles of the powertrain is depicted. An angle measurement 1024 is depicted between a reference line 1020 formed between drive-interfacing shaft 922 and intermediate shaft 924, and a reference line formed between intermediate shaft 924 and motor-interfacing shaft 920. Angle measurement 1024 refers to the gear train angle, which is the smallest angle measured between reference lines 1020 and 1022, with 180 degrees being the maximum angle. Angle measurement 1024 may be less than 90 degrees, 90 degrees, or greater than 90 degrees depending on implementation. An angle of 180 degrees may be referred to as a flat configuration. An angle of less than 180 serves to reduce the overall size of the powertrain in at least a first dimension, while potentially increasing the size of the powertrain in a second dimension that is orthogonal to the first dimension. An angle of less than 90 degrees may be referred to as a folded configuration that provides a compromise between a size of the powertrain in both orthogonal dimensions depicted in FIG. 10.

As previously described with reference to powertrain 10, a dual-independent powertrain may be integrated into a vehicle, such as a three-wheeled vehicle. Within the context of an electric vehicle, such as the three-wheeled vehicle 30 of FIGS. 6 and 7, each motor (e.g., motors 16a, b or 880, 884) and the motor-interfacing shafts that interface with those motors may be located at or closer to the front of the vehicle than the drive-interfacing shafts that interface with the drive wheels. In this configuration, the center of mass of the powertrain is in front of the front wheels. Additionally or alternatively, the center of mass of the powertrain may be located at or below the center of mass of the vehicle and/or at or below a height of the axles of the drive wheels relative to a ground surface.

The dual-independent powertrains disclosed herein may provide numerous benefits that are not present in existing electric powertrains. One benefit is the shared similarity of the components of the dual drive sources, dual transmissions, and their respective gear trains. The use of the same components in each transmission reduces the cost of the powertrain via a higher volume of parts manufactured and/or purchased for each powertrain. Additionally, using similar or identical components between transmissions reduces the complexity of the assembly process, thereby further reducing the cost of the powertrain.

The dual-independent powertrains disclosed herein provide a compact and efficient solution for parallel power delivery, particularly in folded gear train configurations. Because each motor may be independently controlled, the driving performance of the vehicle may be improved, for example, by providing traction control to the vehicle. A wheel that requires more or less rotational force to stabilize the vehicle in rough terrain or during a turn, can make the necessary rotational speed adjustments without affecting the other wheel. The traction control may be electronically controlled by a motor controller or vehicle control system based on inputs from the vehicles steering angle and rotational speed of each wheel at any given moment in time.

Another advantage of disclosed dual-independent powertrains disclosed herein includes, without limitation, the incorporation of electronically controlled anti-locking braking (ABS). The motor controller or vehicle control system can switch the motors from acting as drive motors to acting as power generators. This power generation operations create resistive, counter rotational forces on the motor(s) through the gear trains, which serve to slow the vehicle. Because the wheels may be independently controlled, if one wheel locks up, the control system can reduce the counter rotational force on that wheel without affecting the counter rotational force on the other wheel This feature increases the performance and safety of the vehicle, and gives the driver more control of the vehicle without necessary requiring the addition of a separate anti-lock braking component. When the motors are acting as generators during anti-locking braking operation or other forms of braking, the electricity created can be stored in a battery pack or other suitable energy storage device. This process of regenerative power braking increases the overall efficiency of the vehicle's power use, turning the vehicles momentum into usable electricity for later use.

It will be understood that the configurations and techniques described herein are exemplary in nature. Specific examples are not to be considered in a limiting sense, because numerous variations are possible. The subject matter of the present disclosure includes all novel and nonobvious combinations and subcombinations of the various configurations and techniques disclosed herein, as well as any and all equivalents thereof.

The invention claimed is:

1. A powertrain for a vehicle, comprising:
   a dual-independent transmission enclosure, including:
      a central frame,
      a first enclosure cover interfacing with the central frame to collectively define a first transmission region of the dual-independent transmission enclosure on a first side of the central frame, and
      a second enclosure cover interfacing with the central frame to collectively define a second transmission region of the dual-independent transmission enclosure on a second side of the central frame;
      a first transmission housed within the first transmission region of the dual-independent transmission enclosure, and including a first motor-interfacing shaft, a first drive-interfacing shaft, and a first multi-stage gear train mechanically coupling the first motor-interfacing shaft and the first drive-interfacing shaft;
      a second transmission housed within the second transmission region of the dual-independent transmission enclosure that is mechanically decoupled from the first transmission, and including a second motor-interfacing shaft, a second drive-interfacing shaft, and a second multi-stage gear train mechanically coupling the second motor-interfacing shaft and the second drive-interfacing shaft
      the central frame including a first set of bearings on the first side of the central frame that respectively support and enable rotation of the first motor-interfacing shaft and the first drive-interfacing shaft; and
      the central frame including a second set of bearings on the second side of the central frame that respectively support and enable rotation of the second motor-interfacing shaft and the second drive-interfacing shaft.

2. The powertrain of claim 1, wherein the central frame is located along a central plane of the dual-independent transmission enclosure and is disposed between the first enclosure cover and the second enclosure cover.

3. The powertrain of claim 2, wherein the first transmission and the second transmission are symmetric about the central plane, and each provide the same gear ratio and the same speed reduction.

4. The powertrain of claim 1, wherein the first enclosure cover includes bearings that respectively support and enable rotation of the first motor-interfacing shaft and the first drive-interfacing shaft, each of the bearings of the first enclosure cover arranged within respective openings formed in the first enclosure cover to provide external access to the first motor-interfacing shaft and the first drive-interfacing shaft; and
   wherein the second enclosure cover includes bearings that respectively support and enable rotation of the second motor-interfacing shaft and the drive-interfacing shaft, each of the bearings of the second enclosure cover arranged within respective openings formed in the second enclosure cover to provide external access to the second motor-interfacing shaft and the second drive-interfacing shaft.

5. The powertrain of claim 1, wherein the first multi-stage gear train includes:
   a first larger intermediate gear and a first smaller intermediate gear fixed to a first intermediate shaft, the first intermediate shaft supported by another bearing of the first set of bearings of the central frame and another bearing of the first enclosure cover,
   a first motor-side gear fixed to the first motor-interfacing shaft that meshes with the first larger intermediate gear, wherein the first motor-side gear is smaller than the first larger intermediate gear, and
   a first drive-side gear fixed to the first drive-interfacing shaft that meshes with the first smaller intermediate gear, wherein the first drive-side gear is larger than the first smaller intermediate gear; and
   wherein the second multi-stage gear train includes:
   a second larger intermediate gear and a second smaller intermediate gear fixed to a second intermediate shaft, the second intermediate shaft supported by another bearing of the second set of bearings of the central frame and another bearing of the second enclosure cover,
   a second motor-side gear fixed to the second motor-interfacing shaft that meshes with the second larger intermediate gear, wherein the second motor-side gear is smaller than the second larger intermediate gear, and
   a second drive-side gear fixed to the second drive-interfacing shaft that meshes with the second smaller intermediate gear, wherein the second drive-side gear is larger than the second smaller intermediate gear.

6. The powertrain of claim 5, wherein the first motor-side gear and second motor-side gear are the same size;
   wherein the first larger intermediate gear and the second larger intermediate gear are the same size;
   wherein the first smaller intermediate gear and the second smaller intermediate gear are the same size; and
   wherein the first drive-side gear and second drive-side gear are the same size.

7. The powertrain of claim 5, wherein each of the motor-side gears and each of the larger intermediate gears are helical gears; and
   wherein each of the drive-side gears and each of the smaller intermediate gears are spur gears.

8. The powertrain of claim 1, wherein the central frame defines one or more openings or pathways that enable fluid communication between the first transmission region and the second transmission region to provide a shared fluid region.

9. The powertrain of claim 1, further comprising:
a first electric motor including a first motor shaft coupled to the first motor-interfacing shaft; and
a second electric motor including a second motor shaft coupled to the second motor-interfacing shaft.

10. The powertrain of claim 1, wherein the first drive-interfacing shaft and the second drive-interfacing shaft are collinear.

11. The powertrain of claim 10, wherein the first motor-interfacing shaft and the second motor-interfacing shaft are collinear.

12. The powertrain of claim 11, wherein the first motor-interfacing shaft and the first drive-interfacing shaft are located on an opposite side of the central frame from the second motor-interfacing shaft and the second drive-interfacing shaft.

13. The powertrain of claim 1, wherein the first motor-interfacing shaft, the first drive-interfacing shaft, the second motor-interfacing shaft, and the second drive-interfacing shaft are parallel to each other.

14. The powertrain of claim 1, wherein the first multi-stage gear train and the second multi-stage gear train each includes two or more speed reduction stages.

15. The powertrain of claim 1, further comprising:
a first drive wheel coupled to the first drive-interfacing shaft; and
a second drive wheel coupled to the second drive-interfacing shaft.

16. A three-wheeled electric vehicle, comprising:
a vehicle frame;
a front pair of drive wheels located at or near a front end of the vehicle frame on opposite sides of a central plane of the three-wheeled electric vehicle;
a single rear wheel located at or near a rear end of the vehicle frame; and
a dual-independent powertrain located at the front end of the vehicle frame, the dual-independent powertrain comprising:
a central frame located along the central plane of the three-wheeled electric vehicle,
a first enclosure cover interfacing with the central frame to collectively define a first transmission region on a first side of the central frame,
a first transmission housed within the first transmission region, and including a first motor-interfacing shaft, a first drive-interfacing shaft coupled to or interfacing with a first drive wheel of the front pair of drive wheels, and a first multi-stage fixed-ratio gear train mechanically coupling the first motor-interfacing shaft and the first drive-interfacing shaft,
a first electric motor coupled to or interfacing with the first motor-interfacing shaft on a first side of the central plane, the first motor and the first motor-interfacing shaft located at or closer to the front of the vehicle than the first drive-interfacing shaft,
a second enclosure cover interfacing with the central frame to collectively define a second transmission region on a second side of the central frame,
a second transmission housed within the second transmission region that is mechanically decoupled from the first transmission, and including a second motor-interfacing shaft, a second drive-interfacing shaft coupled to or interfacing with a second drive wheel of the front pair of drive wheels, and a second multi-stage fixed-ration gear train mechanically coupling the second motor-interfacing shaft and the second drive-interfacing shaft, and
a second electric motor coupled to or interfacing with the second motor-interfacing shaft on a second side of the central plane, the second motor and the second motor-interfacing shaft located at or closer to the front end of the vehicle than the second drive-interfacing shaft.

17. The three-wheeled electric vehicle of claim 16, wherein the first drive-interfacing shaft is located on the first side of the central plane and the second drive-interfacing shaft is located on the second side of the central plane.

18. The three-wheeled electric vehicle of claim 16, wherein the central frame defines one or more openings or pathways that enable fluid communication between the first transmission region and the second transmission region to provide a shared fluid region.

19. A powertrain for a vehicle, comprising:
a dual-independent transmission enclosure, including:
a central frame,
a first enclosure cover interfacing with the central frame to collectively define a first fluid-tight region on a first side of the central frame, and
a second enclosure cover interfacing with the central frame to collectively define a second fluid-tight region on a second side of the central frame;
a first transmission housed within the dual-independent transmission enclosure, and including a first motor-interfacing shaft, a first drive-interfacing shaft, and a first multi-stage gear train mechanically coupling the first motor-interfacing shaft and the first drive-interfacing shaft; and
a second transmission housed within the dual-independent transmission enclosure that is mechanically decoupled from the first transmission, and including a second motor-interfacing shaft, a second drive-interfacing shaft, and a second multi-stage gear train mechanically coupling the second motor-interfacing shaft and the second drive-interfacing shaft;
wherein the first motor-interfacing shaft and the second drive-interfacing shaft are located on the first side of the central frame;
wherein the second motor-interfacing shaft and the first drive-interfacing shaft are located on a second side of the central frame;
wherein the first motor-interfacing shaft and the second motor-interfacing shaft are not collinear with each other; and
wherein the first drive-interfacing shaft and the second drive-interfacing shaft are collinear with each other.

* * * * *